United States Patent
Park et al.

(10) Patent No.: US 9,894,187 B2
(45) Date of Patent: Feb. 13, 2018

(54) METHODS AND ARRANGEMENTS FOR SHORT BEACON FRAMES IN WIRELESS NETWORKS

(75) Inventors: Minyoung Park, Portland, OR (US); Adrian P. Stephens, Cambridge (GB); Thomas J. Kenney, Portland, OR (US); Emily H. Qi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 160 days.

(21) Appl. No.: 13/977,704

(22) PCT Filed: Dec. 31, 2011

(86) PCT No.: PCT/US2011/068260
§ 371 (c)(1),
(2), (4) Date: Mar. 19, 2014

(87) PCT Pub. No.: WO2013/052077
PCT Pub. Date: Apr. 11, 2013

(65) Prior Publication Data
US 2014/0192713 A1  Jul. 10, 2014

Related U.S. Application Data

(60) Provisional application No. 61/543,870, filed on Oct. 6, 2011.

(51) Int. Cl.
*H04L 29/06* (2006.01)
*H04B 7/26* (2006.01)
*H04W 52/02* (2009.01)

(52) U.S. Cl.
CPC .......... *H04L 69/22* (2013.01); *H04B 7/2656* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| 7,787,401 B2 * | 8/2010 | Kinder | H04W 48/12 370/310 |
| 2005/0071517 A1 * | 3/2005 | O'Mahony | H04L 12/4633 710/1 |

(Continued)

FOREIGN PATENT DOCUMENTS

| WO | 2013/022469 A1 | 2/2013 |
| WO | 2013/052077 A1 | 4/2013 |

OTHER PUBLICATIONS

International Search Report and Written opinion received for PCT Patent Application No. PCT/US2011/068260, dated Oct. 29, 2012, 10 Pages.

(Continued)

*Primary Examiner* — Christopher Crutchfield
*Assistant Examiner* — Tito Pham (57) ABSTRACT

Embodiments provide a new short beacon frame format and its operation with full beacon frame transmissions for wireless communications devices. Many embodiments comprise a medium access control (MAC) sublayer logic to build frames comprising the short beacon frame for a first communications device. In some embodiments, the MAC sublayer may determine a frame control field comprising a type field indicative of an extension frame and a subtype indicative of a short beacon. In further embodiments, the frame control field may comprise a service set identifier (SSID) control field, and a reserved field. Some embodiments may store the short beacon frame or frame format in memory, in logic, or in another manner that facilitates transmission of the short beacon frames. Some embodiments may receive and detect communications with the short beacon frames. Further embodiments may generate and transmit a communication with the short beacon frames.

25 Claims, 6 Drawing Sheets

TYPE AND SUBTYPE VALUES FOR SHORT BEACON FRAME  1090

| TYPE VALUE | DESCRIPTION | SUBTYPE VALUE | DESCRIPTION |
|---|---|---|---|
| 11 | EXTENSION | 0001 | SHORT BEACON FRAME |

(56) References Cited

U.S. PATENT DOCUMENTS

| | | |
|---|---|---|
| 2007/0287456 A1 | 12/2007 | Shimizu |
| 2008/0225768 A1 | 9/2008 | Wentink |
| 2008/0270588 A1* | 10/2008 | Sultan ............... H04L 12/4641 709/223 |
| 2009/0016306 A1 | 1/2009 | Wang et al. |
| 2009/0088183 A1 | 4/2009 | Piersol et al. |
| 2009/0274094 A1* | 11/2009 | Engwer ............... H04W 48/12 370/328 |
| 2010/0110949 A1 | 5/2010 | Lundsgaard |
| 2010/0111066 A1* | 5/2010 | Mehta ............... H04W 52/0216 370/345 |
| 2010/0202339 A1* | 8/2010 | Chieng ............... H04L 12/5895 370/312 |
| 2010/0239252 A1* | 9/2010 | Davis ............... H04L 12/2885 398/58 |
| 2013/0142124 A1* | 6/2013 | Abraham ............ H04W 28/06 370/328 |

OTHER PUBLICATIONS

International Search Report and Written opinion received for PCT Patent Application No. PCT/US2011/065572, dated Sep. 25, 2012, 11 Pages.

* cited by examiner

MANAGEMENT FRAME 1060

| OCTETS: 2 | 6 | 4 | 2 | 1-8 | 2 | 1 | 4 |
|---|---|---|---|---|---|---|---|
| FRAME CONTROL 1062 | SA (BSSID) 1064 | TIME STAMP 1066 | SBFI 1068 | SSID 1070 | CAPABILITY 1072 | CHANGE SEQUENCE 1074 | FCS 1076 |

VARIABLE

FIG. 1B

FRAME CONTROL FIELD 1080

| BITS: 2 | 2 | 4 | 3 | 5 |
|---|---|---|---|---|
| PROTOCOL VERSION 1082 | TYPE 1084 | SUBTYPE 1086 | SSID CONTROL 1088 | RESERVED 1089 |

FIG. 1C

TYPE AND SUBTYPE VALUES FOR SHORT BEACON FRAME 1090

| TYPE VALUE | DESCRIPTION | SUBTYPE VALUE | DESCRIPTION |
|---|---|---|---|
| 11 | EXTENSION | 0001 | SHORT BEACON FRAME |

METHODS AND ARRANGEMENTS FOR SHORT BEACON FRAMES IN WIRELESS NETWORKS

BACKGROUND

Embodiments are in the field of wireless communications. More particularly, embodiments are in the field of communications protocols between wireless transmitters and receivers.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments provide a new short beacon frame format and its operation with full beacon frame transmissions for wireless communications devices. Many embodiments comprise medium access control (MAC) sublayer logic to build the short beacon frame for a first communications device. In many embodiments, the MAC sublayer logic may determine a short beacon based upon a short beacon format stored in memory. In some embodiments, the MAC sublayer may determine a frame control field comprising a type field indicative of an extension frame and a subtype indicative of a short beacon. In further embodiments, the frame control field may comprise a service set identifier (SSID) control field. In several embodiments, the short beacon frame may comprise a source address field, a timestamp field, a short beacon to full beacon interval (SFBI) field, an SSID field, a capability field, a change sequence field, and a frame check sequence (FCS) field. In some embodiments, the stations may include mapping information for service set identifications (SSIDs) to translate a hash of an SSID to an SSID. Embodiments may determine and transmit and/or receive and interpret short beacon frames.

Embodiments may allow a station to enter a wake state for some random time frame, receive a short beacon, enter a sleep state to reduce power consumption, and wake again at the time of transmission of a full beacon frame, a time that can be determined from the data in the short beacon frame, to receive a full beacon frame. Stations may thereby receive the full network information with minimized power consumption. Some embodiments may enter a low power state or mode after receipt of a short beacon frame and wake from the low power mode to a second power mode after a time period of SFBI to receive a full beacon. In several embodiments, a communications device may wake to receive the full beacon after receiving a short beacon frame with a change sequence field value indicative of a revision in the operations of an access point.

Some embodiments implement a 1 MHz channel bandwidth for IEEE 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest physical layer (PHY) rate is used for beacon and control frame transmissions. Although lowering the data rate may increase the transmission range, it takes much longer time to transmit a packet. Full Beacon frames are transmitted periodically with a typical frame size of approximately 200 bytes. Using 162.5 Kbps data rate, it takes approximately 10 msec. to transmit. If all beacon frames are full beacon frames and are transmitted every 100 milliseconds, approximately 10 percent of airtime is consumed by beacon transmissions. Embodiments employ a short beacon frame for such a low data rate operation to maintain necessary basic functionalities, deliver full information to non-AP stations, and reduce the airtime consumed by beacon frames. According to tone embodiment, the efficiency of the protocol is improved, which can enable small battery powered wireless devices (e.g. sensors) to use Wi-Fi to connect to the Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the Institute of Electrical and Electronic Engineers (IEEE) IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
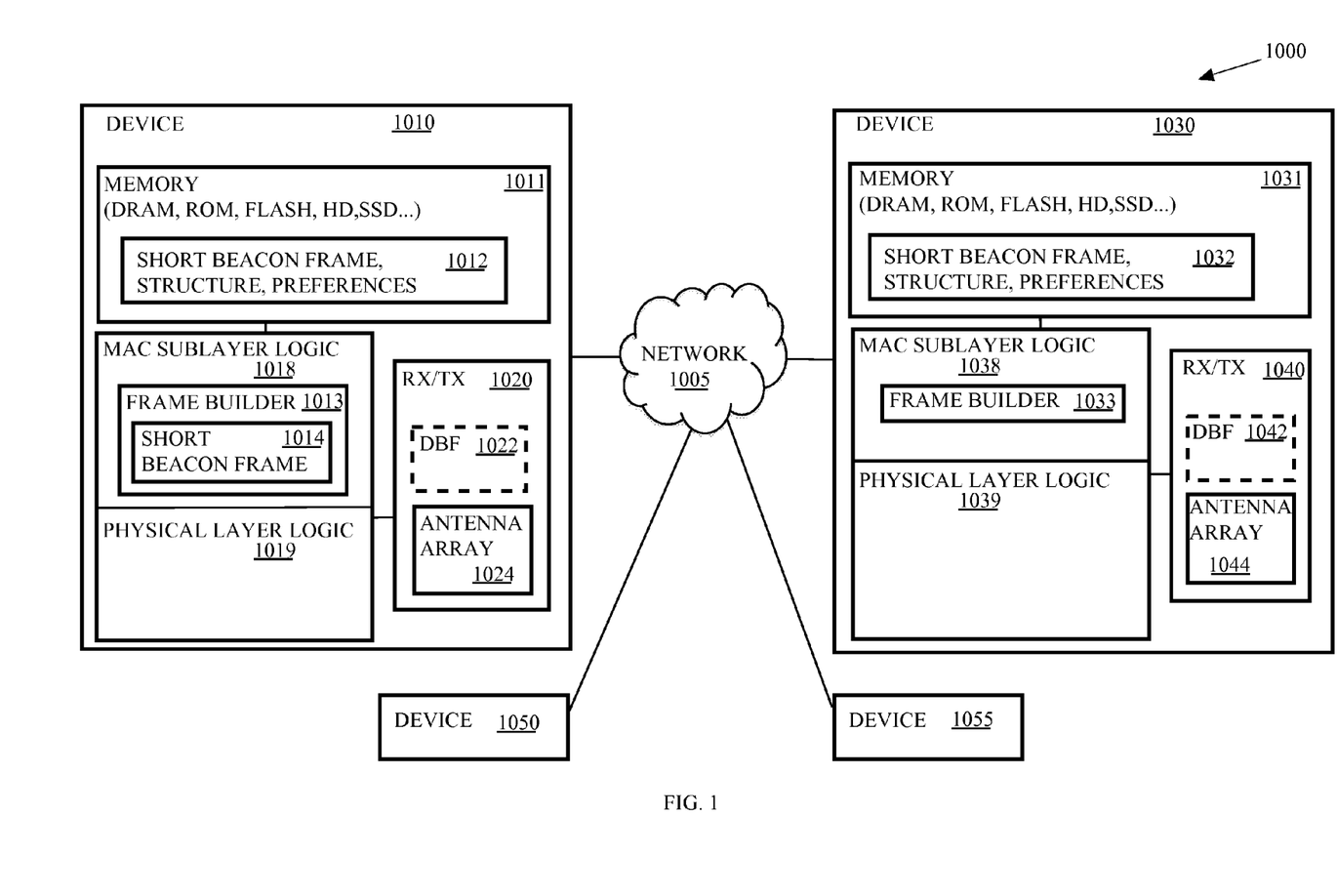
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter. Initially, communications device 1030 may receive a short beacon frame from communications device 1010, sleep for a period equal to a short beacon to full beacon interval (SBFI) included within the short beacon frame at a low power state, wake at the end of the SBFI to a second power state, receive a full beacon, and, thereafter send a communication to associate with communications device 1010. Periodically thereafter, the communications device 1030 may initiate communications with the metering substation to transmit data related to water usage. Furthermore, the communications device 1030 may periodically receive a short beacon frame from the communications device 1010 and determine, based upon a change sequence field of the short beacon frame, whether the communications device 1010 has implemented changes that communications device 1030 should receive from a full beacon frame.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, Media Access Control (MAC) sublayer logic 1018 and 1038, and physical layer logic 1019 and 1039, respectively. The memory 1011 and 1031 may comprise a storage medium such as Dynamic Random-Access Memory (DRAM), read only memory (ROM), flash memory, a hard disk drive, a solid-state drive, or the like. The memory 1011 and 1031 may store the frames such as the short beacon frame and/or the short beacon frame structure, or portions thereof. The memory 1011 may also comprise a preference or set of preferences related to the timing or timing intervals for sending short and full beacon frames. For instance, the preferences may be user configurable and may include a parameter indicative of one or more short beacon to full beacon transmission ratios. The preferences may include a default parameter indicating, for instance, that ten short beacon frames should be transmitted for each full beacon frame transmitted. In other embodiments, the default setting may differ.

In further embodiments, the memory 1031 may comprise mapping information. The mapping information may provide information to relate a hash of a service set identification (SSID) to a full SSID. In such embodiments, the SSID may be transmitted in the short beacon frame as a hash of the SSID that is, e.g., one octet, to reduce the size of the short beacon frame and reduce airtime associated with transmission of the short beacon frame.

The MAC sublayer logic 1018, 1038 may comprise logic to implement functionality of the MAC sublayer of the data link layer of the communications device 1010, 1030. The MAC sublayer logic 1018, 1038 may generate the frames such as short beacon frames and full beacon frames, and the physical layer logic 1019, 1039 may generate physical layer protocol data units (PPDUs) based upon the frames. More specifically, the frame builders 1013 and 1033 may generate frames and the data unit builders of the physical layer logic 1019, 1039 may encapsulate the frames with preambles to generate PPDUs for transmission via a physical layer device such as the transceivers (RX/TX) 1020 and 1040.

The short beacon frame 1014, also referred to as MAC layer Protocol Data Units (MPDUs), may comprise a management frame. For example, frame builder 1013 may generate a management frame 1034 such as the short beacon frame to identify the communications device 1010 with capabilities such as supported data rates, privacy settings, quality of service support (QoS), power saving features, cross-support, and a service set identification (SSID) of the network to identify the network to the communications device 1030.

After receiving the short beacon frame from the communications device 1010, the communications device 1030 may determine to associate with the network (SSID) identified by the short beacon frame. In some embodiments, the short beacon frame 1014 may comprise sufficient information for the communications device 1030 to respond with an association request frame to request association with the network via the communications device 1010. In further embodiments, the communications device 1030 may determine from the short beacon frame 1014 the time interval to the next full beacon frame transmission (SBFI) and switch to a low power consumption mode until the time to wake to a normal power mode to receive the full beacon frame from the communications device 1010.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1A:
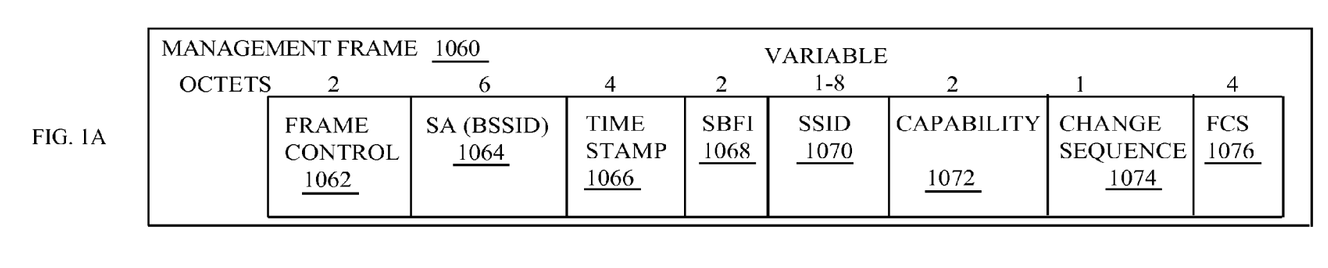
FIG. 1A depicts an embodiment of a management frame for establishing communications between wireless communication devices.

FIG. 1A depicts an embodiment of a management frame 1060 for communications between wireless communication devices such as communications devices 1010, 1030, 1050, and 1055 in FIG. 1. The management frame 1060 may comprise a frame control field 1062, a source address (SA) field 1064, a timestamp field 1066, a short beacon to full beacon interval (SBFI) field 1068, a service set identifier (SSID) field 1070, a capability field 1072, a change sequence field 1074, and a frame check sequence (FCS) field 1076.

Figure 1B:
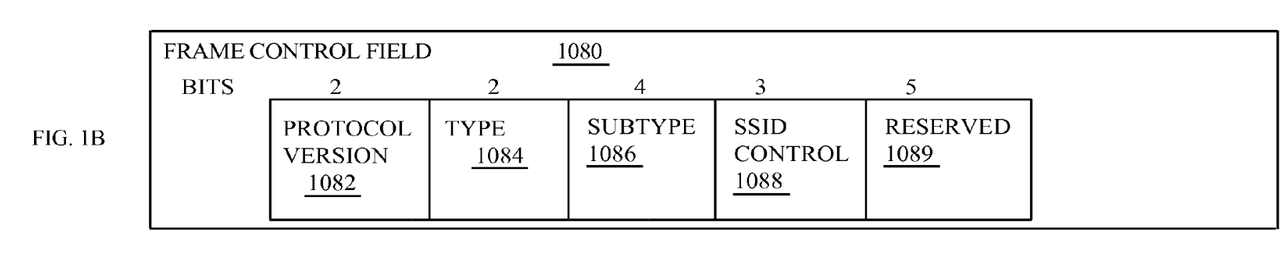
FIG. 1B depicts an embodiment of a frame control field of the management frame in FIG. 1A.

The frame control field 1062 may be two octets and may identify the type and subtype of the frame such as an extension type and short beacon subtype frame. FIG. 1B illustrates an embodiment of a frame control field 1080 such as frame control field 1062 comprising a type field 1084 that has two bits and a subtype field 1086 that has four bits. Note that the number of octets and the number of bits illustrated in FIGS. 1A-C describe the lengths of the fields in some embodiments. Other embodiments may implement different length fields.

The SA field 1064 may be six octets and may identify the full medium access control (MAC) address of the frame's source, which may be the base service set identification (BSSID) for an access point (AP). The timestamp field 1066 may be four octets and may represent the value of the timing synchronization function (TSF) timer of the frame's source.

The SBFI field 1068 may be two octets and may indicate the amount of time that will elapse between the target short beacon transmission time (TSBTT) and the target full beacon transmission time (TFBTT), which is the time interval to the next full beacon frame transmission. For example, a first short beacon frame may comprise a first time interval equal to the TFBTT minus the first TSBTT. Thereafter, the AP may transmit a second short beacon frame with a second SFBI equal to the TFBTT minus the second TSBTT.

The SSID field 1070 may be a variable length of one to eight octets and may identify service set identification. Referring again to FIG. 1B, there is shown an embodiment of a frame control field 1080 such as frame control field 1062 comprising an SSID control field 1088 that has three bits. In the present embodiment, if the SSID Control field 1088 is set to 0, an SSID Hash may be used in the SSID field and the length of the SSID field may be 1 octet long. This minimizes the length of the short beacon frame. In some embodiments, if the SSID Control field 1088 is set to a number N, wherein N may be equal to a number from 1 through 7, a shorter version of a full SSID is used and the SSID field 1070 length is (N+1) octets long. In several embodiments, stations may set N between 1 and 7 for situations in which such stations do not have the mapping information between the SSID Hash and the full SSID.

In other embodiments, the SSID Control field 1088 may comprise 5 bits [B8 . . . B12] and to support up to a 32 octets long full SSID. In such embodiments, the reserved field 1089 may be reduced to 3 bits [B13 . . . B15] to accommodate the additional bits in the SSID Control field 1088.

The Protocol Version field 1082 may be two bits in length and may be invariant in size and in placement. The value of the protocol version field 1082 may represent the revision of the corresponding standard that the frame represents. The revision level will be incremented when a fundamental incompatibility exists between a new revision and the prior edition protocol version so MAC sublayer logic such as the MAC sublayer logic 1038 that receives a frame with a higher revision level than it supports shall discard the frame. Reception by the MAC sublayer logic such as the MAC sublayer logic 1038 of communications device 1030 implies that the frame contents are valid, and that the protocol version field 1082 value is supported, with no implication regarding frame addressing or regarding whether the frame type or other fields in the MAC header are meaningful to the MAC sublayer logic that has received the frame.

The capability field 1072 may be two octets and may identify the capabilities of the source communications device. The capability field 1072 may deliver basic supporting capabilities of the AP so that the stations receiving the short beacon frame can decide whether to receive more information from the AP or to look for another AP with the right, compatible, or more compatible capabilities. The capability field 1072 may comprise values indicative of a QoS capability, privacy, short preamble, channel agility, spectrum management, short time slot, automatic power save delivery (APSD), packet binary convolutional code (PBCC), distribution system service (DSSS) orthogonal frequency division multiplexing (OFDM) modulation (DSSS-OFDM), and, in some embodiments, other information. In some embodiments, some of the information about the AP's capabilities may be included within the reserved field 1089.

The change sequence field 1074 may be one octet and may indicate that a change may have been made to the operation of the AP. The change may indicate to a station that the station should receive a full beacon frame such as the next full beacon frame to determine the significant change to the operation of the AP. According to one embodiment, when a station receives a short beacon frame with a change sequence field 1074 value different from what it received in the last full beacon frame, the station can decide whether to receive a new full beacon frame or not. If the station decides to receive an undated full beacon frame, it can use the SFBI information in the short beacon frame so that the station does not need to wait in the active state consuming power to receive the full beacon frame but can stay in the sleep state during the SFBI time interval and wake up to an active state just before the next full beacon frame transmission.

Figure 1C:
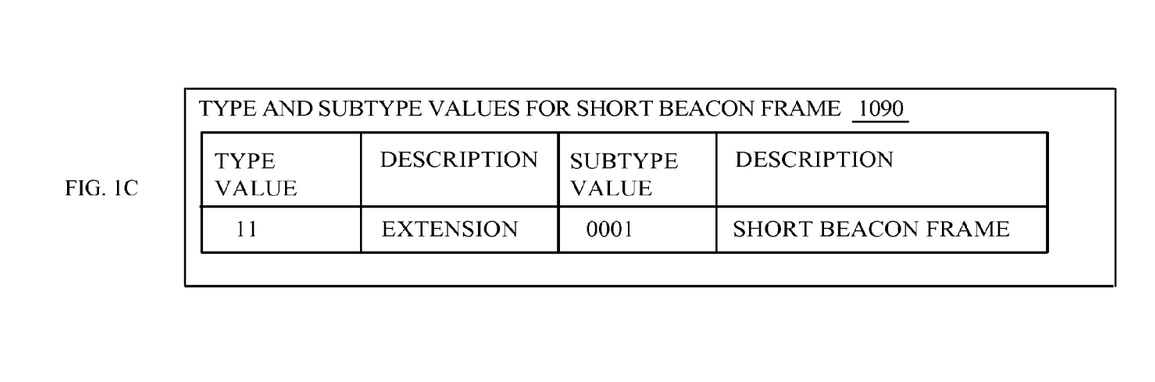
FIG. 1C depicts an embodiment of a table of values for a type and subtype fields of the frame control field in FIG. 1B.

Referring now to FIG. 1C, there is shown a table indicating the type and subtype of the short beacon frame such as the short beacon frame structure illustrated in FIGS. 1A-B. Note that the values shown are for illustrative purposes and may be any values that meet the length requirements of the type and subtype fields 1084 and 1086 or other length requirements as defined in other embodiments.

Figure 1D:
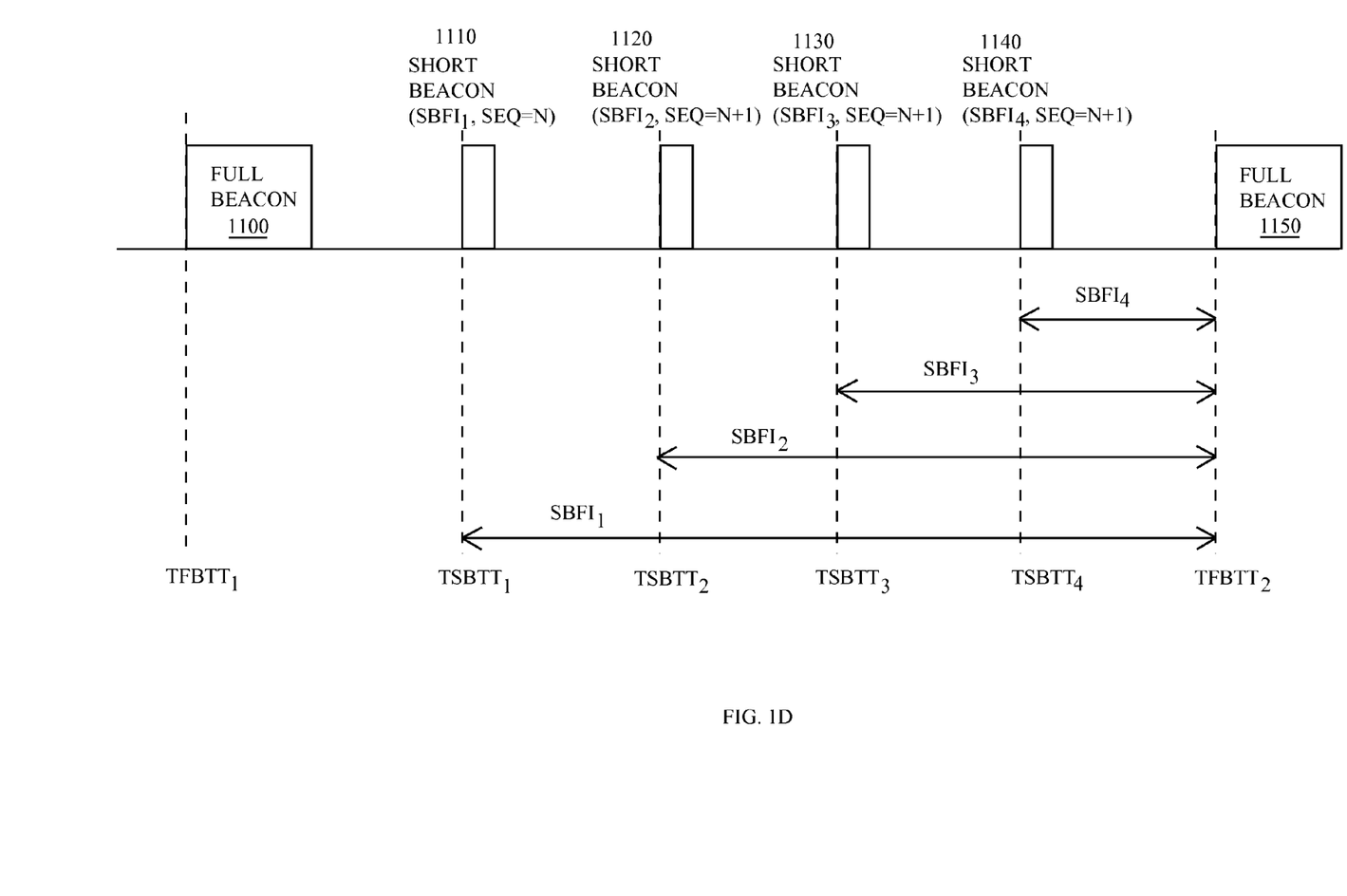
FIG. 1D depicts an embodiment of a timing diagram for short beacons and full beacons for a system such as the system illustrated in FIG. 1.

FIG. 1D illustrates an embodiment of a timing diagram for short beacon and full beacon communications between wireless communication devices. In particular, FIG. 1D illustrates transmission of a full beacon frame 1100 at transmission time, target full beacon transmission time, TFBTT(1). The access point transmits a short beacon frame 1110 at transmission time, target short beacon transmission time, TSBTT(1). The short beacon frame 1110 may include an indication that the time interval to the next transmission of the full beacon frame at TFBTT(2) is short beacon to full beacon time interval, SFBI(1). Thereafter, the AP may transmit a short beacon frame 1120 at TSBTT(2) and indicate an SFBI(2). SFBI(2) may be the time interval from TSBTT(2) to TFBTT(2). The AP may transmit a short beacon frame 1130 at TSBTT(3) and indicate an SFBI(3). SFBI(3) may be the time interval from TSBTT(3) to TFBTT (2). The AP may transmit a short beacon frame 1140 at TSBTT(4) and indicate an SFBI(4). SFBI(4) may be the time interval from TSBTT(4) to TFBTT(2). And the AP may transmit the second full beacon frame 1150 at TFBTT(2). In other embodiments, the ratio of short beacon frames to full beacon frames may be different and/or may be a user-configurable setting. In further embodiments, the number of short beacon frames transmitted by the AP between transmission of the full beacon frames may be determined based upon capabilities of associated stations. And in other embodiments, the AP may automatically determine the setting based upon the capabilities of associated stations and/or other factors.

To illustrate, according to one embodiment, the relationship between the full beacon frames and the short beacon frames may implement an SFBI that is 2 octets long and uses a 1024 microseconds time unit (TU). In such embodiments, the maximum time interval between a short beacon frame and the next full beacon frame may be approximately 64 seconds. With the SFBI information, a station does not need to stay awake waiting for the full beacon frame but can stay in the sleep state until the next full beacon transmission. In several embodiments, this ability to enter a sleep state until transmission of the next full beacon frame and enter a wake state to receive the next full beacon frame may prevent many stations from transmitting a probe request frame right after receipt of a short beacon frame to receive full information from the AP.

Figure 2:
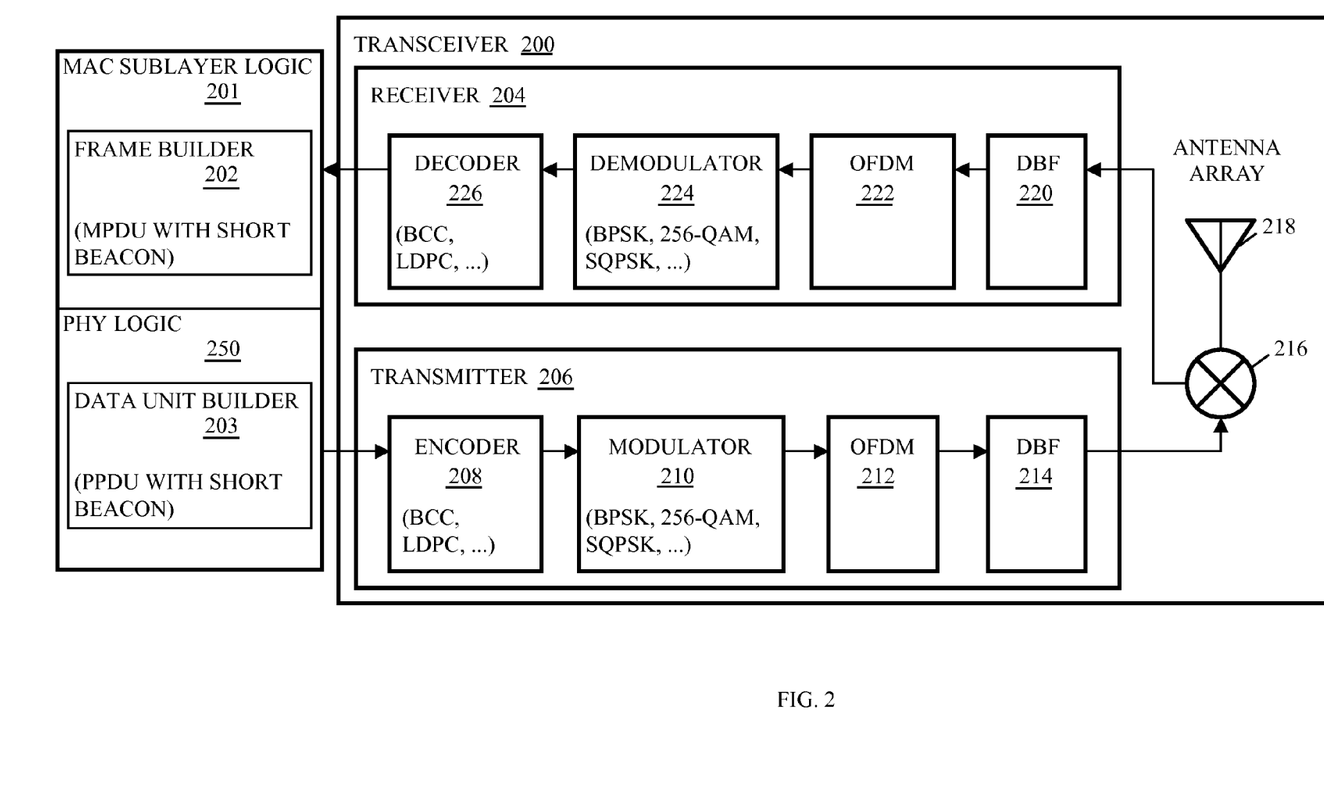
FIG. 2 depicts an embodiment of an apparatus to generate, transmit, receive and interpret a short beacon frame.

FIG. 2 depicts an embodiment of an apparatus to generate, transmit, receive, and interpret a device profile index element in a frame. The apparatus comprises a transceiver 200 coupled with Medium Access Control (MAC) sublayer logic 201 and a physical layer (PHY) logic 250. The MAC sublayer logic 201 may generate short beacon frames and full beacon frames and the PHY logic 250 may generate PPDUs based upon the frames to transmit via transceiver 200.

In many embodiments, the MAC sublayer logic 201 may comprise a frame builder 202 to generate a short beacon frame (MPDU). The short beacon frame may comprise data indicative of an extension type of management frame and a short beacon subtype maintained by an access point such as communications device 1010 in FIG. 1. For example, a frame builder 202 may generate a frame including a type field that specifies, e.g., the frame is an extension type management frame and a subtype field to specify the function of the frame as a short beacon frame. In many embodiments, the frame control field of the short beacon frame may indicate the length of the SSID field. The frame may also comprise a timestamp, a time interval until the next full beacon such as the SBFI field in FIG. 1A, and a value indicative of whether the next full beacon frame may include revised information about the operations of the AP such as the change sequence field in FIG. 1A.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the PHY logic 250 with, e.g., a binary convolutional coding (BCC), a low-density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random-Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

For embodiments in which the MAC sublayer logic 201 is part of an access point, the MAC sublayer logic 201 may parse the MPDU to determine the interval to transmission of the next full beacon frame. The MAC sublayer logic 201 may then utilize the indicated time interval to the next full beacon frame and may enter a sleep state to await transmission of the full beacon frame. In some embodiments, the MAC sublayer logic 201 may determine the change sequence field, determine that the change sequence field indicates a change in the operations of the AP or source communications device, and may determine to sleep for a time period less than the time interval to the transmission of the next full beacon frame. In further embodiments, the MAC sublayer logic 201 may determine that the change sequence field does not indicate that changes have been made to the operations of the AP and may determine that receipt of the full beacon frame is unnecessary for continued operations and may enter a sleep state until a time to perform other operations in a wake state such as gathering sensor data and/or transmitting the sensor information to the AP.

Figure 3:
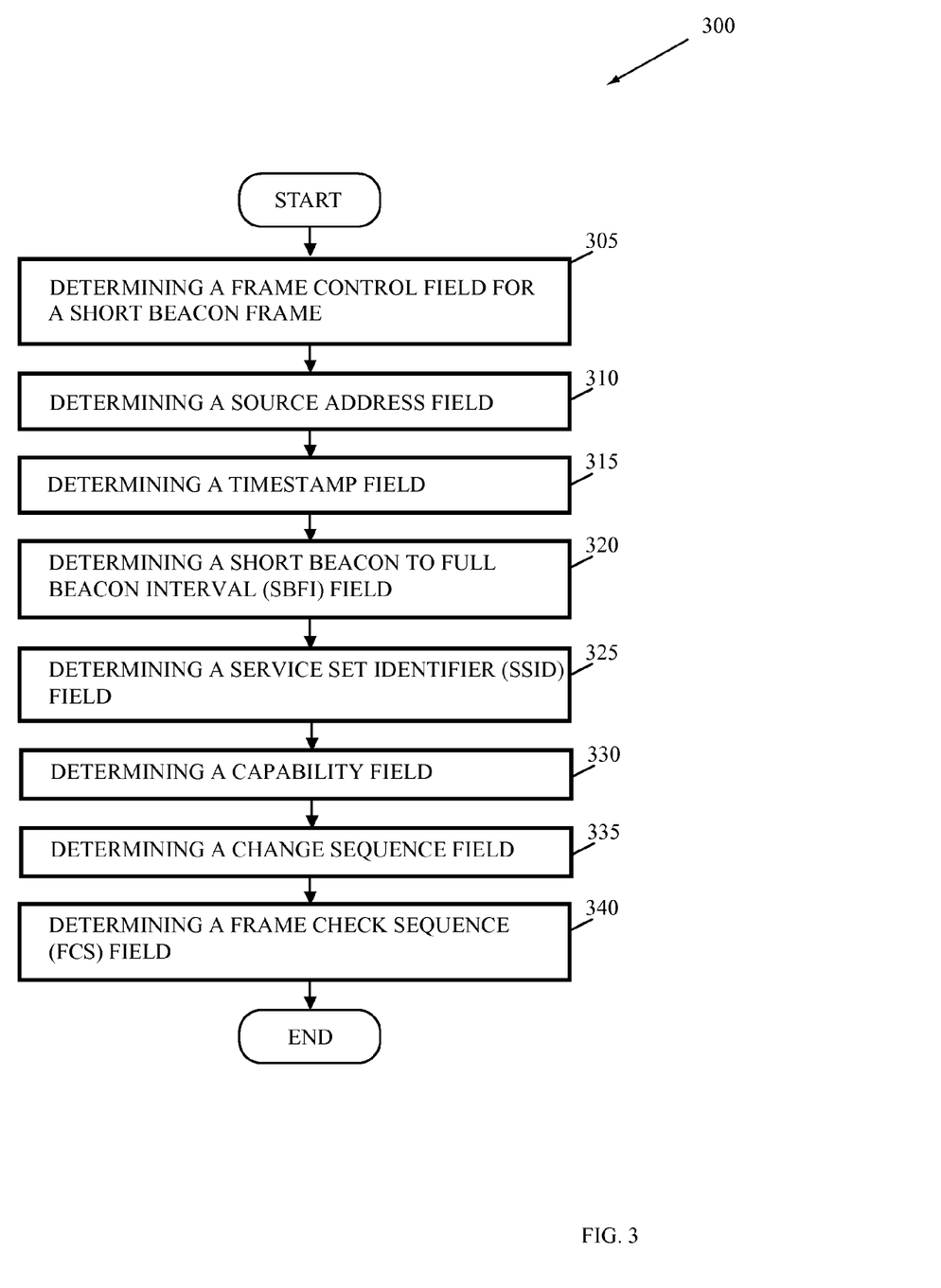
FIG. 3 depicts an embodiment of a flowchart to generate a management frame for a short beacon.

FIG. 3 depicts an embodiment of a flowchart 300 to determine a frame with a device profile index element. The flowchart 300 begins with a medium access control (MAC) sublayer logic determining a frame control field for a short beacon frame (element 305). For instance, the MAC sublayer logic may determine a protocol version field to be the current revision of the standard, a type being an extension of a management frame such as a value of 11, a subtype being a short beacon frame such as a value of 0010, an SSID control field of 0 indicative of a hash of the SSID in the SSID field of one octet in length, and a reserved field 1089 that may comprise padding or may comprise values indicative of capabilities or other information.

The MAC sublayer logic may determine a source address field that may comprise including the MAC address of the AP (element 310). The MAC sublayer logic may determine a timestamp field that may include a timestamp of the time at which this frame is being transmitted (element 315), determine the SBFI field which may include an indication of the time interval between the timestamp and the transmission of the next full beacon (element 320), and determine the SSID field which may include that hash of the SSID (element 325). In other embodiments, the SSID control field may include another value and the SSID may be longer and include a portion of the full SSID or a value indicative thereof.

In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic or PHY logic or otherwise be available for insertion into a frame. In still other embodiments, the MAC sublayer logic may generate the values of the fields of the short beacon frame based upon access to indications of the values for each.

After determining the other portions of the short beacon frame, the MAC sublayer logic may determine a frame check sequence (FCS) field value (element 335) to provide for error corrections at the access point.

Figure 4A:
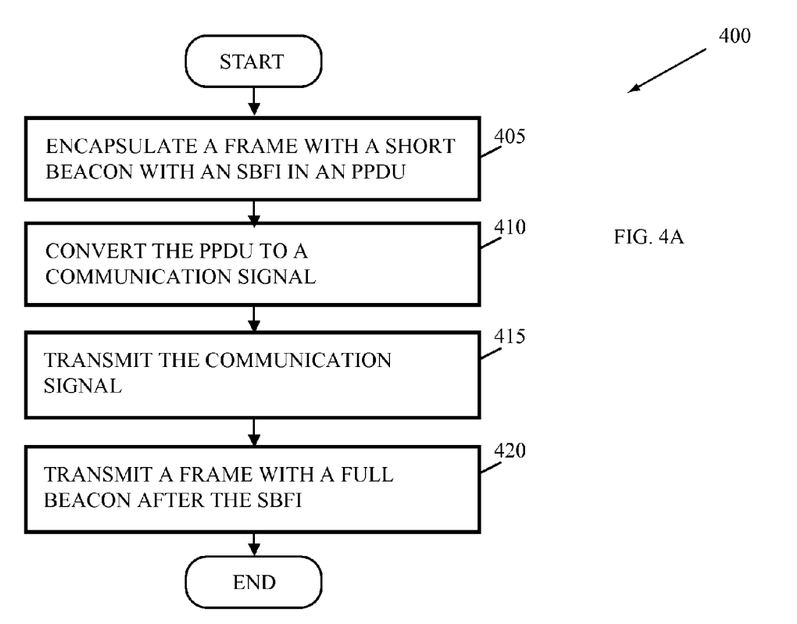
FIGS. 4A-B depict embodiments of flowcharts to transmit, receive, and interpret communications with short and full beacons as illustrated in FIG. 2.
Figure 4B:
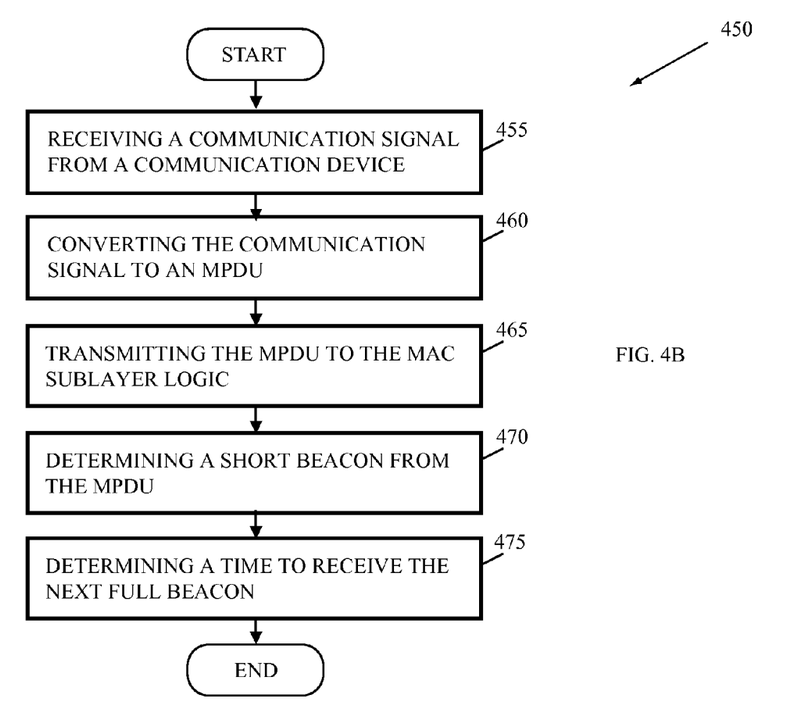

FIGS. 4A-B depict embodiments of flowcharts 400 and 450 to transmit, receive, and interpret communications with a short beacon frame as illustrated in FIG. 2. Referring to FIG. 4A, the flowchart 400 may begin with receiving a frame from the frame builder comprising a short beacon frame control field indicative of an extension type, a short beacon subtype, a time interval until transmission of the next full beacon frame, and, in many embodiments, an indication of a change in the operations of the AP that may be reflected in subsequent full beacon frames. The MAC sublayer logic of the communications device may generate the frame as a management frame to transmit to an access point and may pass the frame as an MPDU to a data unit builder that transforms the data into a packet that can be transmitted to the access point. The data unit builder may generate a preamble to encapsulate the PSDU (the MPDU from the frame builder) to form a PPDU for transmission (element 405). In some embodiments, more than one MPDU may be encapsulated in a PPDU.

The PPDU may then be transmitted to the physical layer device such as the transmitter 206 in FIG. 2 or the transceiver 1020,1040 in FIG. 1 so the PPDU may be converted to a communication signal (element 410). The transmitter may then transmit the communication signal via the antenna (element 415).

After waiting a period of time equal to the short beacon to full beacon time interval, the AP may transmit a full beacon frame in an MPDU to nearby stations (element 420).

Referring to FIG. 4B, the flowchart 450 begins with a receiver of an access point such as the receiver 204 in FIG. 2 receiving a communication signal via one or more antenna(s) such as an antenna element of antenna array 218 (element 455). The receiver may convert the communication signal to an MPDU in accordance with the process described in the preamble (element 460). More specifically, the received signal is down-converted and fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine short beacon field values from the MPDU (element 470) such as the frame control fields 1080 in FIG. 1B including the format of the SSID field, the type and subtype of the frame, the protocol version associated with the frame and, in some embodiments, additional data from the reserved field. Then the MAC sublayer logic may determine time interval until transmission of the full beacon frame from the AP (element 475). For example, the MAC sublayer logic may utilize the time interval to the transmission of the next full beacon frame to determine a period of time during which the device should enter a low power state or mode before awakening into a second power state or mode to receive the next full beacon frame transmission.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements related to a short beacon frame for communications between wireless devices. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
generating, by a medium access control sublayer logic, one or more short beacon frames between generation of each full beacon frame to reduce airtime consumed by transmission of the beacon frames, the one or more short beacon frames comprising a field indicative of a time interval to a subsequent transmission of a full beacon frame, wherein the one or more short beacon frames comprise a frame control field, wherein the frame control field comprises a type field with a type value indicative of one of multiple frame types and a subtype field with a subtype value, the multiple frame types to comprise a control frame type, a management frame type, a data frame type, and the one of the multiple frame types, each frame type to be associated with a set of subtype values, the subtype value being indicative of a short beacon frame based upon a corresponding value in a set of subtype values associated with the one of the multiple frame types; and
encapsulating, by a physical layer logic, the beacon frames with preambles to create physical layer protocol data units to transmit.

2. The method of claim 1, wherein generating the one or more short beacon frames comprises generating at least one of the short beacon frames with a change sequence field comprising a value indicative of a revision of operations of a communications device comprising the medium access control sublayer logic.

3. The method of claim 1, generating the one or more short beacon frames comprises generating at least one of the short beacon frames with a service set identification control field, wherein a value of the service set identification control field is indicative of a format of the service set identification field in the at least one of the short beacon frames.

4. The method of claim 3, wherein generating the at least one of the short beacon frames with the service set identification control field comprises generating the at least one of the short beacon frames with the service set identification control field, wherein the value of the service set identification control field indicates that the service set identification field comprises a hash of the service set identification.

5. The method of claim 3, wherein generating the at least one of the short beacon frames with the service set identification control field comprises generating the at least one of the short beacon frames with the service set identification control field, wherein the value of the service set identification control field indicates that the service set identification field comprises a portion of the service set identification.

6. A device comprising:
a memory;
a processor coupled with the memory to generate a frame comprising a frame control field, the frame control field comprising a type field with a type value indicative of one of multiple frame types and a subtype field with a subtype value, the multiple frame types to comprise a control frame type, a management frame type, a data frame type, and the one of the multiple frame types, each frame type to be associated with a set of subtype values, the subtype value being indicative of a short beacon frame based upon a corresponding value in a set of subtype values associated with the one of the multiple frame types, and the frame further comprising a field indicative of a time interval to a subsequent transmission of a full beacon frame.

7. The device of claim 6, wherein the processor comprises logic to generate the frame with a change sequence field comprising a value indicative of a revision of operations of the device.

8. The device of claim 6, wherein the processor comprises logic to generate the frame with a service set identification control field, wherein a value of the service set identification control field is indicative of a format of a service set identification field in the frame.

9. The device of claim 8, wherein the processor comprises logic to generate the frame with a hash of a service set identification.

10. The device of claim 8, wherein the processor comprises logic to generate the frame with a portion of a service set identification.

11. A method comprising:
receiving, by a medium access control sublayer logic, a frame comprising a field indicative of a time interval to a subsequent transmission of a full beacon frame, wherein the frame comprises a frame control field, wherein the frame control field comprises a type field with a type value indicative of one of multiple frame types and a subtype field with a subtype value, the multiple frame types to comprise a control frame type, a management frame type, a data frame type, and the one of the multiple frame types, each frame type to be associated with a set of subtype values, the subtype value being indicative of a short beacon frame based upon a corresponding value in a set of subtype values associated with the one of the multiple frame types;
determining, by the medium access control sublayer logic, based upon the frame, the time interval to the subsequent transmission of the full beacon frame;
entering a low power state for a time period based upon the time interval to the subsequent transmission of the full beacon frame;
entering a second power state; and
receiving, by the medium access control sublayer logic, the full beacon frame.

12. The method of claim 11, wherein receiving the full beacon frame comprises receiving the full beacon frame, by the medium control access sublayer logic via an antenna coupled with a physical layer device, the full beacon frame with a preamble.

13. The method of claim 11, further comprising storing, by the medium access control sublayer logic, at least part of the frame in memory.

14. The method of claim 11, further comprising determining a value indicative of a revision of operations of an access point based upon the frame to determine to receive the full beacon frame.

15. The method of claim 11, further comprising determining a value of a service set identification control field is indicative of a format of a service set identification field in the frame and determining the service set identification based upon a portion of the service set identification in the service set identification field.

16. The method of claim 11, further comprising determining a value of the service set identification control field is indicative of a hash format of a service set identification in the frame and determining mapping information to determine the service set identification based upon a hash of the service set identification in the service set identification field.

17. A device comprising:
a memory;
a processor coupled with the memory to receive a frame comprising a field indicative of a time interval to a subsequent transmission of a full beacon frame, wherein the frame comprises a frame control field, wherein the frame control field comprises a type field with a type value indicative of one of multiple frame types and a subtype field with a subtype value, the multiple frame types to comprise a control frame type, a management frame type, a data frame type, and the one of the multiple frame types, each frame type to be associated with a set of subtype values, the subtype value being indicative of a short beacon frame based upon a corresponding value in a set of subtype values associated with the one of the multiple frame types; to determine, based upon the frame, the time interval to the subsequent transmission of the full beacon frame; to enter a low power state to await transmission of the full beacon frame; to enter a second power state to receive the full beacon frame; and to receive the full beacon frame.

18. The device of claim 17, further comprising a transmitter coupled with the processor to transmit the frame.

19. The device of claim 18, further comprising an antenna coupled with the transmitter to transmit the frame.

20. The device of claim 17, wherein the processor comprises logic to determine the frame with a change sequence field comprising a value indicative of a revision of operations of a communications device comprising the processor and to determine to receive the full beacon based upon the value indicative of the revision of operations.

21. The device of claim 17, wherein the processor comprises logic to determine the frame with a service set identification control field, wherein the value of the service set identification control field is indicative of a format of a service set identification field in the frame and to determine the service set identification based upon a portion of the service set identification in the service set identification field.

22. The device of claim 17, wherein the processor comprises logic to determine the frame with a hash of the service set identification, to determine mapping information to determine the service set identification based upon a hash of the service set identification in the service set identification field, and to determine the service set identification based upon the hash.

23. A machine-accessible product comprising:
a non-transitory medium containing instructions, which, when executed by a processor of a machine, cause the machine to perform operations, wherein the operations comprise:
generating, by a medium access control sublayer logic, a frame comprising a field control field, wherein the frame control field comprises a type field with a type value indicative of one of multiple frame types, a subtype field with a subtype value, the multiple frame types to comprise a control frame type, a management frame type, a data frame type, and the one of the multiple frame types, each frame type to be associated with a set of subtype values, the subtype value being indicative of a short beacon frame based upon a corresponding value in a set of subtype values associated with the one of the multiple frame types, the frame further comprising a field indicative of a time interval to a subsequent transmission of a full beacon frame.

24. The machine-accessible product of claim 23, wherein the operations further comprise generating the frame with a change sequence field comprising a value indicative of a revision of operations of a communications device comprising the medium access control sublayer logic.

25. The machine-accessible product of claim 23, wherein the operations further comprise generating the frame with a service set identification control field, wherein the value of the service set identification control field is indicative of a format of the service set identification field in the frame.

* * * * *